(12) United States Patent
Kuriyama et al.

(10) Patent No.: US 12,187,323 B2
(45) Date of Patent: Jan. 7, 2025

(54) AIMING DEVICE, DRIVING CONTROL SYSTEM, AND METHOD FOR CALCULATING CORRECTION AMOUNT OF SENSOR DATA

(71) Applicant: HITACHI ASTEMO, LTD., Hitachinaka (JP)

(72) Inventors: Akira Kuriyama, Ibaraki (JP); Haruki Nishimura, Ibaraki (JP); Shunsuke Matsuo, Ibaraki (JP); Naoto Aoki, Ibaraki (JP); Tatsuhiko Monji, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 430 days.

(21) Appl. No.: 17/629,870

(22) PCT Filed: Jul. 14, 2020

(86) PCT No.: PCT/JP2020/027322
§ 371 (c)(1),
(2) Date: Jan. 25, 2022

(87) PCT Pub. No.: WO2021/024712
PCT Pub. Date: Feb. 11, 2021

(65) Prior Publication Data
US 2022/0289245 A1    Sep. 15, 2022

(30) Foreign Application Priority Data
Aug. 2, 2019    (JP) .................................. 2019-142898

(51) Int. Cl.
*B60W 60/00*    (2020.01)
*G01S 13/86*    (2006.01)
(Continued)

(52) U.S. Cl.
CPC ....... *B60W 60/0027* (2020.02); *G01S 13/867* (2013.01); *G01S 13/931* (2013.01);
(Continued)

(58) Field of Classification Search
CPC ....... B60W 60/0027; B60W 2420/403; B60W 50/029; B60W 50/14; B60W 60/00186;
(Continued)

(56) References Cited

U.S. PATENT DOCUMENTS 8,730,457 B2 * 5/2014 Rothenberger ......... G01S 17/87
356/3.01
9,129,211 B2 * 9/2015 Zeng ....................... G06F 30/20
(Continued)

FOREIGN PATENT DOCUMENTS

DE    102016009756 A1 *  2/2018
JP    H05-288847 A      11/1993
(Continued)

OTHER PUBLICATIONS

DE102016009756A1 English translation (Year: 2018).*
(Continued)

*Primary Examiner* — Angelina M Shudy
(74) *Attorney, Agent, or Firm* — Foley & Lardner LLP

(57) ABSTRACT

To correct an axis deviation of a sensor. An aiming device, which calculates correction amounts of detection results of two or more sensors using the detection results of the sensors, includes: a sensor coordinate conversion unit that converts sensor data detected by the sensor from a coordinate system unique to the sensor into a predetermined unified coordinate system; a target selection unit that selects predetermined features from the sensor data detected by each of the sensors; a function fitting unit that defines functions each approximating an array state of the selected features for the respective sensors; a fitting result compari- (Continued)

son unit that compares the functions each approximating the array state of the features detected by each of the sensors; and a correction value calculation unit that calculates a correction amount for converting coordinates of the features detected by the sensors from a result of the comparison of the functions.

7 Claims, 11 Drawing Sheets

(51) Int. Cl.
  *G01S 13/931* (2020.01)
  *G06T 7/80* (2017.01)
(52) U.S. Cl.
  CPC ......... *G06T 7/80* (2017.01); *B60W 2420/403* (2013.01); *G06T 2207/30244* (2013.01); *G06T 2207/30252* (2013.01)
(58) Field of Classification Search
  CPC ... B60W 2050/021; B60W 2050/0215; B60W 2050/0292; B60W 2050/143; B60W 2050/146; B60W 2420/408; B60W 2552/50; B60W 2556/25; B60W 2556/35; B60W 50/0205; G01S 13/867; G01S 13/931; G01S 7/4004; G01S 2013/9322; G06T 7/80; G06T 2207/30244; G06T 2207/30252; G08G 1/16; G05D 1/00
  See application file for complete search history.

(56) References Cited

U.S. PATENT DOCUMENTS

| | | | |
|---|---|---|---|
| 10,578,713 B2* | 3/2020 | Yomo | G01S 13/931 |
| 10,582,121 B2* | 3/2020 | Kamilov | G01S 13/89 |
| 11,002,859 B1* | 5/2021 | Zhang | G01S 19/393 |
| 11,828,867 B2* | 11/2023 | Tuxen | G01S 13/58 |
| 11,892,536 B2* | 2/2024 | Kondo | G01S 13/70 |
| 11,912,301 B1* | 2/2024 | Hendy | B60W 60/00276 |
| 2002/0067287 A1* | 6/2002 | Delcheccolo | H01Q 3/24 |
| | | | 340/901 |
| 2003/0169945 A1* | 9/2003 | Stanek | G01S 3/7865 |
| | | | 382/296 |
| 2007/0073473 A1* | 3/2007 | Altan | G01S 13/862 |
| | | | 701/518 |
| 2008/0300787 A1* | 12/2008 | Zeng | G01S 13/931 |
| | | | 701/301 |
| 2011/0295549 A1* | 12/2011 | Takabayashi | G01S 13/86 |
| | | | 702/142 |
| 2012/0007985 A1* | 1/2012 | Inui | H04N 17/002 |
| | | | 348/148 |
| 2012/0062396 A1* | 3/2012 | Inoue | B62D 15/027 |
| | | | 340/932.2 |
| 2012/0290169 A1* | 11/2012 | Zeng | G01S 7/4972 |
| | | | 701/30.2 |
| 2013/0101230 A1* | 4/2013 | Holeva | B66F 9/24 |
| | | | 382/224 |
| 2013/0250068 A1* | 9/2013 | Aoki | H04N 17/002 |
| | | | 348/47 |
| 2014/0043473 A1* | 2/2014 | Gupta | H04N 17/002 |
| | | | 348/135 |
| 2014/0139671 A1* | 5/2014 | Oh | G06T 7/80 |
| | | | 348/148 |
| 2015/0120137 A1* | 4/2015 | Zeng | B60R 21/0134 |
| | | | 701/41 |
| 2016/0035108 A1* | 2/2016 | Yu | A61B 5/721 |
| | | | 382/131 |
| 2017/0336496 A1 | 11/2017 | Fujii et al. | |
| 2018/0074506 A1* | 3/2018 | Branson | G06N 3/04 |
| 2018/0120416 A1 | 5/2018 | Kitamura | |
| 2018/0156914 A1* | 6/2018 | Tuxen | G01S 7/02 |
| 2018/0313942 A1 | 11/2018 | Wu et al. | |
| 2018/0341007 A1* | 11/2018 | Fetterman | G01S 7/4972 |
| 2019/0072646 A1* | 3/2019 | Zelený | G01S 7/4004 |
| 2019/0156128 A1* | 5/2019 | Zhang | G06V 20/588 |
| 2019/0187250 A1* | 6/2019 | Ru | G01S 7/4052 |
| 2020/0049511 A1* | 2/2020 | Sithiravel | G01S 13/865 |
| 2020/0081112 A1* | 3/2020 | Li | G01S 13/58 |
| 2020/0142421 A1* | 5/2020 | Palanisamy | G06N 3/08 |
| 2020/0276983 A1 | 9/2020 | Iida | |
| 2020/0300991 A1* | 9/2020 | Kawanai | G01S 17/42 |
| 2020/0327696 A1* | 10/2020 | Habib | G01S 17/89 |
| 2021/0004610 A1* | 1/2021 | Huang | G01S 7/4814 |
| 2021/0018615 A1* | 1/2021 | Su | G01S 13/726 |
| 2021/0033722 A1* | 2/2021 | Sondergaard | G01S 13/867 |
| 2021/0223378 A1* | 7/2021 | Tuxen | G01S 13/88 |
| 2021/0302534 A1* | 9/2021 | Kellner | G01S 7/403 |
| 2021/0331695 A1* | 10/2021 | Ramakrishnan | G06V 10/803 |
| 2022/0055660 A1* | 2/2022 | Bälter | G08G 1/165 |
| 2022/0130109 A1* | 4/2022 | Arbabian | G01S 13/867 |
| 2022/0197285 A1* | 6/2022 | Gassend | G01S 7/497 |
| 2022/0244731 A1* | 8/2022 | Suzuki | G05D 1/0219 |
| 2022/0244732 A1* | 8/2022 | Suzuki | G05D 1/0219 |
| 2022/0281476 A1* | 9/2022 | Aoki | B60W 40/12 |
| 2022/0284628 A1* | 9/2022 | Tuxen | A63B 71/0616 |
| 2022/0289245 A1* | 9/2022 | Kuriyama | B60W 60/00186 |
| 2023/0044311 A1* | 2/2023 | Matsuo | G01S 13/931 |
| 2023/0135628 A1* | 5/2023 | Arai | H04N 23/683 |
| | | | 348/208.2 |
| 2023/0156331 A1* | 5/2023 | Arai | G06T 5/60 |
| | | | 348/208.2 |
| 2023/0174061 A1* | 6/2023 | Aizawa | G06V 20/58 |
| 2024/0005641 A1* | 1/2024 | Bhatia | G06T 3/40 |

FOREIGN PATENT DOCUMENTS

| | | | |
|---|---|---|---|
| JP | H07270536 A | * | 10/1995 |
| JP | H08-271247 A | | 10/1996 |
| JP | 2004-198159 A | | 7/2004 |
| JP | 2010-249613 A | | 11/2010 |
| JP | 2015-078925 A | | 4/2015 |
| JP | 2016-156725 A | | 9/2016 |
| JP | 2017-207334 A | | 11/2017 |
| WO | WO-2019/097731 A1 | | 5/2019 |

OTHER PUBLICATIONS

JPH07270536A English translation (Year: 1995).*
International Search Report with English translation and Written Opinion issued in corresponding application No. PCT/JP2020/027322 dated Nov. 2, 2020.

* cited by examiner

1

AIMING DEVICE, DRIVING CONTROL SYSTEM, AND METHOD FOR CALCULATING CORRECTION AMOUNT OF SENSOR DATA

TECHNICAL FIELD

The present invention relates to an in-vehicle control device, and more particularly to an aiming device that corrects sensor data.

BACKGROUND ART

Driving assistance systems and automatic driving systems have been developed in order to achieve various purposes such as reducing traffic accidents, reducing burden on drivers, improving fuel efficiency to reduce burden on the global environment, and providing transportations for vulnerable road users to realize a sustainable society. In these driving assistance systems and automatic driving systems, a plurality of vehicle periphery monitoring sensors are provided in order to monitor the periphery of a vehicle instead of a driver. Furthermore, a function of performing correction even if an attachment angle of the vehicle periphery monitoring sensor deviates is required in order to guarantee the safety of these systems.

The following related arts are the background technologies in this technical field. PTL 1 (JP 2015-078925 A) describes a periphery monitoring device that determines a deviation of a detection axis of a distance measuring sensor from a deviation between a position on a vehicle Cartesian coordinate system identified by a first position identifying unit and a position on the vehicle Cartesian coordinate system identified by a second position identifying unit regarding an object existing in an overlapping area between detection ranges of a first distance measuring sensor whose detection range includes an orientation in which a reference target whose relative position to the first distance measuring sensor is fixed exists and a second distance measuring sensor having a detection range that partially overlaps with the detection range of the first distance measuring sensor (see the abstract).

Further, PTL 2 (JP 2010-249613 A) describes an obstacle recognition device, which recognizes an obstacle by combining a plurality of pieces of sensor information, including: a front camera that acquires information on a first parameter related to the obstacle; a millimeter wave radar that acquires information on a second parameter related to the obstacle; a correction unit that calculates the amount of an axis deviation of an azimuth of the front camera or the millimeter wave radar based on the first parameter information acquired by the front camera and the second parameter information acquired by the millimeter wave radar and corrects the axis deviation of the front camera or the millimeter wave radar based on the calculated amount of the axis deviation; and a storage unit that stores the amount of the axis deviation.

CITATION LIST

Patent Literature

PTL 1: JP 2015-078925 A
PTL 2: JP 2010-249613 A

SUMMARY OF INVENTION

Technical Problem

Meanwhile, in PTL 1, the deviation of the detection axis of the sensor is determined based on the detection position of the object existing in the area where the detection areas of the plurality of sensors overlap, but there is a problem that it is difficult to determine the axis deviation when the detection areas of the plurality of sensors do not overlap. Further, in PTL 2, a detection axis deviation of a sensor is determined based on the second parameter information related to the obstacle existing in an area where detection areas of a plurality of sensors overlap, but there is a problem that it is difficult to determine the axis deviation when the detection areas of the plurality of sensors do not overlap because it is difficult to determine whether the first parameter and the second parameter are based on the same target.

Solution to Problem

A typical example of the invention disclosed in the present application is as follows. That is, an aiming device, which calculates correction amounts of detection results of two or more sensors using the detection results of the sensors, includes: a sensor coordinate conversion unit that converts sensor data detected by the sensor from a coordinate system unique to the sensor into a predetermined unified coordinate system; a target selection unit that selects predetermined features from the sensor data detected by each of the sensors; a function fitting unit that defines functions each approximating an array state of the selected features for the respective sensors; a fitting result comparison unit that compares the functions each approximating the array state of the features detected by each of the sensors; and a correction value calculation unit that calculates a correction amount for converting coordinates of the features detected by the sensors from a result of the comparison of the functions.

Advantageous Effects of Invention

According to the present invention, the axis deviation of the sensor can be corrected. Other objects, configurations, and effects which have not been described above will become apparent from embodiments to be described hereinafter.

DESCRIPTION OF EMBODIMENTS

Hereinafter, the best modes for carrying out the present invention will be described in detail with reference to the drawings. Incidentally, the same reference signs will be attached to blocks or elements having the same function in the entire drawing for describing the modes for carrying out the invention, and the repetitive description thereof will be omitted.

First Embodiment

Figure 1:
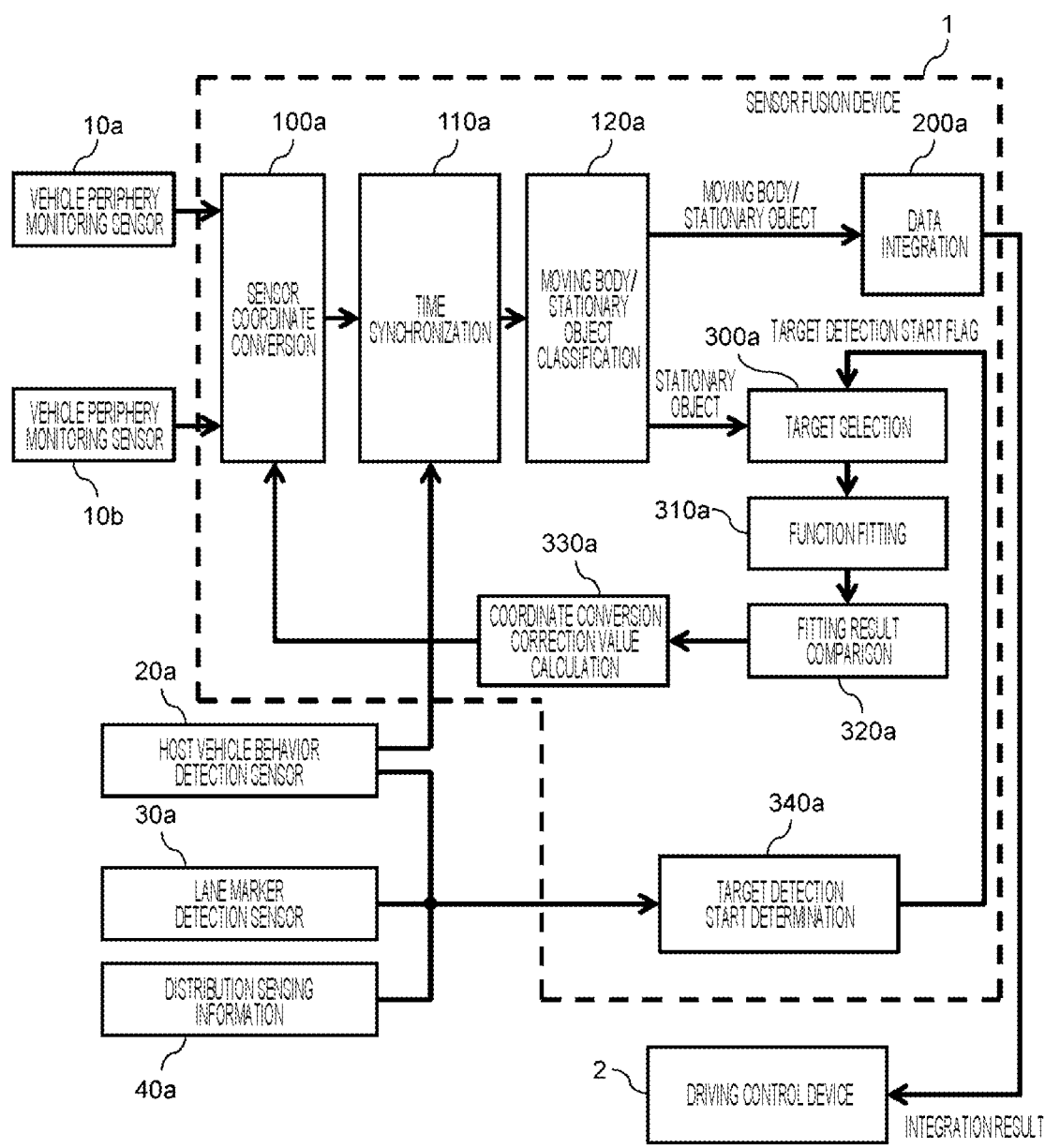
FIG. 1 is a functional block diagram of a sensor fusion device having a sensor aiming function of a first embodiment.
Figure 2:
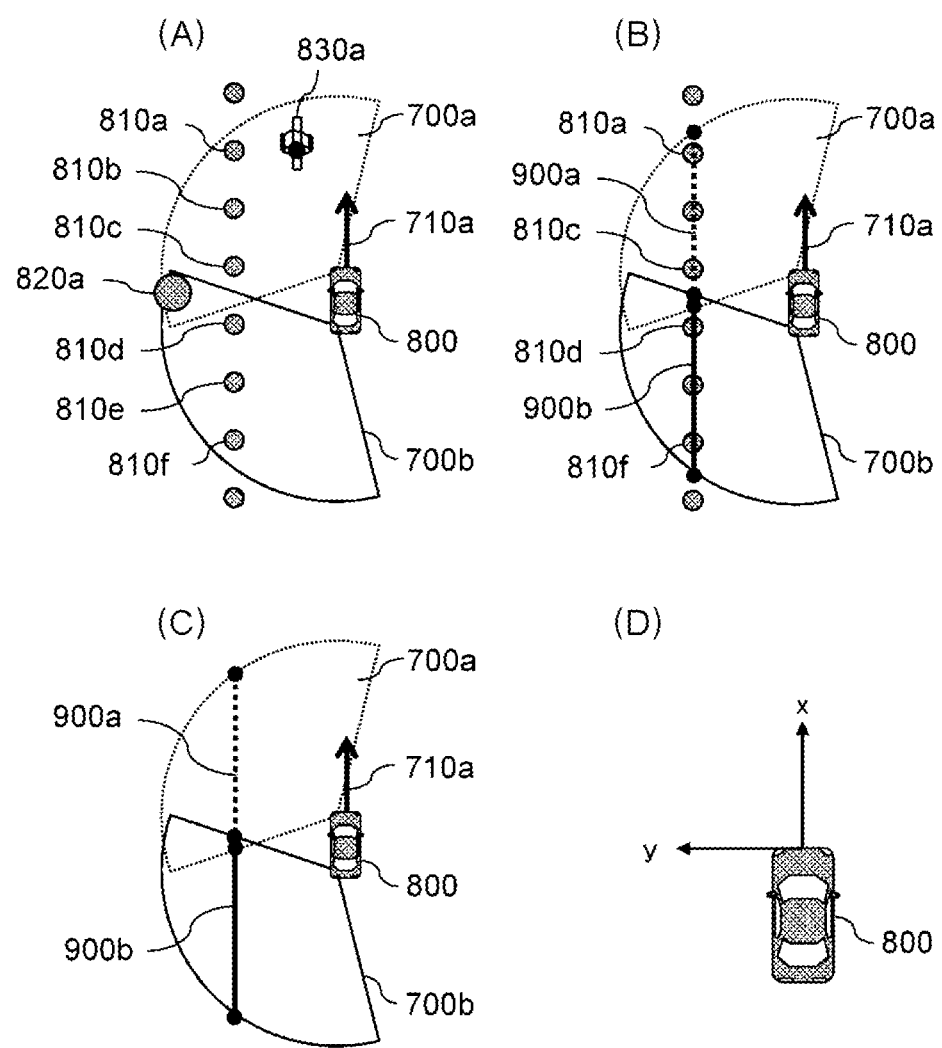
FIG. 2 is a conceptual view illustrating a processing method of the sensor fusion device having the sensor aiming function of the first embodiment.
Figure 3:
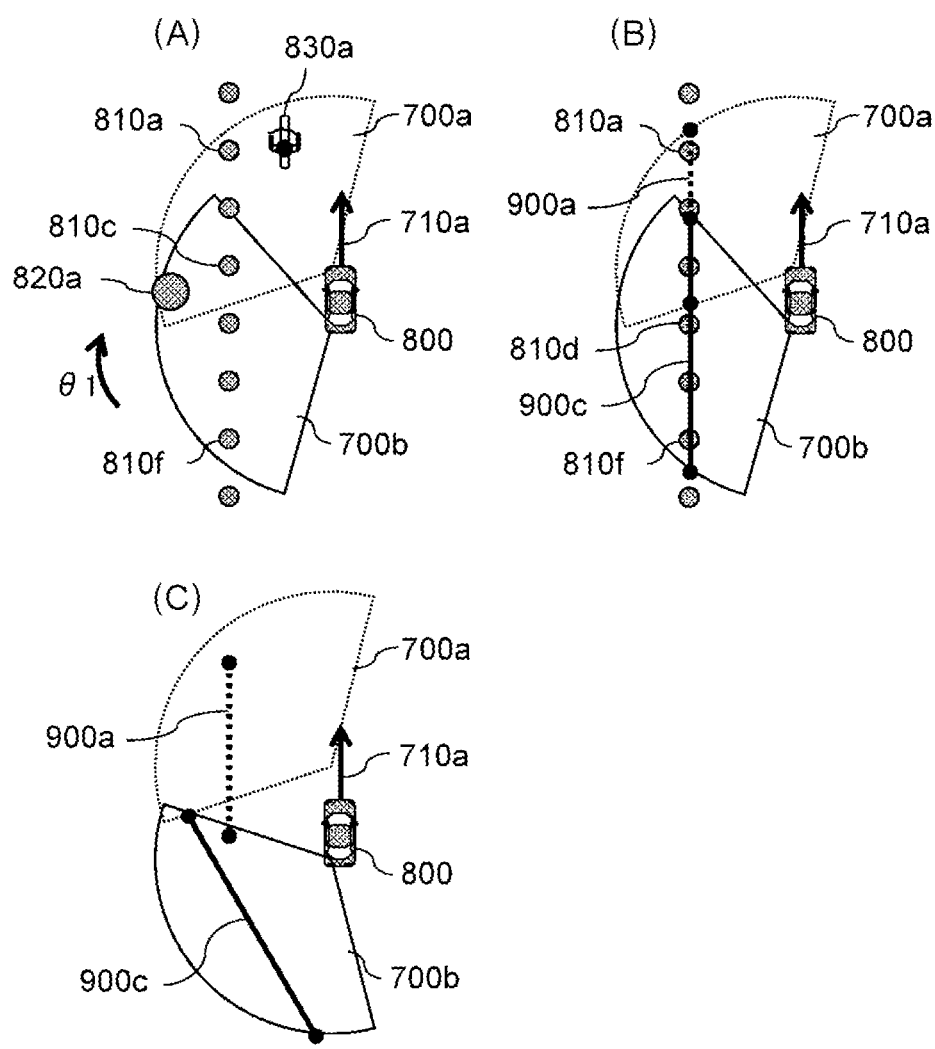
FIG. 3 is a conceptual view illustrating a processing method of the sensor fusion device having the sensor aiming function of the first embodiment.
Figure 4:
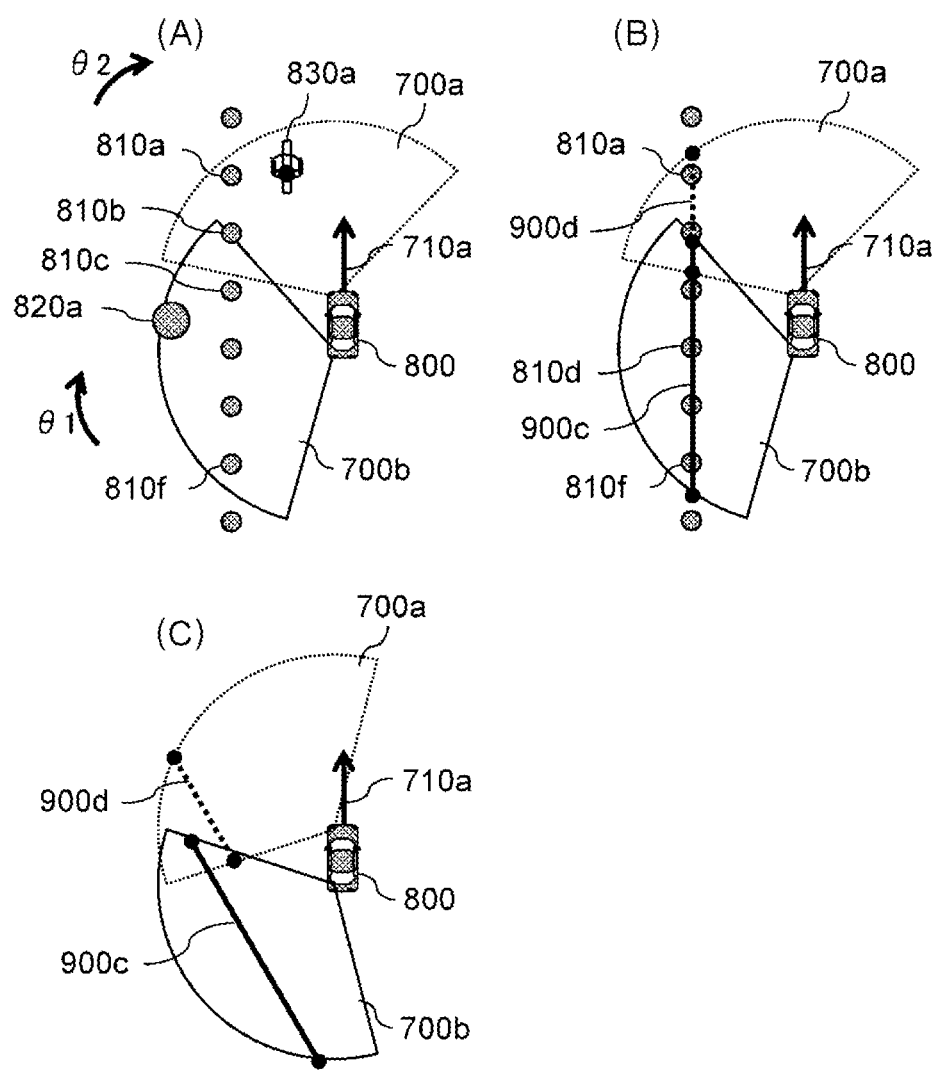
FIG. 4 is a conceptual view illustrating a processing method of the sensor fusion device having the sensor aiming function of the first embodiment.

FIG. 1 is a functional block diagram illustrating an embodiment of a sensor fusion device 1 having a sensor aiming function. FIGS. 2 to 4 are conceptual views illustrating processing of the sensor fusion device 1 having the sensor aiming function. A processing flow and an operation of the sensor fusion device 1 having the sensor aiming function, which is a first embodiment of the present invention, will be described with reference to FIGS. 1 to 4.

First, the functional block configuration of the sensor fusion device 1 having the sensor aiming function of the embodiment of the present invention will be described. As illustrated in FIG. 1, the sensor fusion device 1 of the present embodiment includes a sensor coordinate conversion unit 100a, a sensor time synchronization unit 110a, a moving body/stationary object classification unit 120a, a sensor data integration unit 200a, a first target selection unit 300a, a function fitting unit 310a, a first fitting result comparison unit 320a, a coordinate conversion correction value calculation unit 330a, and a first target detection start determination unit 340a. The sensor aiming function is configured by the respective units other than the sensor data integration unit 200a of the sensor fusion device 1, and the sensor aiming device is realized by the respective units other than the sensor data integration unit 200a. Further, output signals of a first vehicle periphery monitoring sensor 10a, a second vehicle periphery monitoring sensor 10b, a host vehicle behavior detection sensor 20a, and a lane marker detection sensor 30a and distribution sensing information 40a are input to the sensor fusion device 1.

The first and second vehicle periphery monitoring sensors 10a and 10b are sensors that detect targets around a host vehicle. The host vehicle behavior detection sensor 20a is a group of sensors that detect a speed, a yaw rate, and a steering angle of the host vehicle. The lane marker detection sensor 30a is a sensor that detects a lane marker (for example, a road center line, a lane boundary line, a road outside line formed by paint, road studs, or the like). The distribution sensing information 40a is a traveling environment of the host vehicle (for example, travel map data including a curvature of a road and the like).

The sensor fusion device 1 (electronic control unit) and various sensors (the first vehicle periphery monitoring sensor 10a, the second vehicle periphery monitoring sensor 10b, and the like) of the present embodiment are computers (microcomputers) each including an arithmetic unit, a memory, and an input/output device.

The arithmetic unit includes a processor and executes a program stored in the memory. A part of processing performed by the arithmetic unit executing the program may be executed by another arithmetic unit (for example, hardware such as a field programmable gate array (FPGA) and an application specific integrated circuit (ASIC)).

The memory includes a ROM and a RAM which are non-volatile storage elements. The ROM stores an invariable program (for example, a BIOS) and the like. The RAM is a high-speed and volatile storage element such as a dynamic random access memory (DRAM) and a non-volatile storage element such as a static random access memory (SRAM), and stores the program executed by the arithmetic unit and data used at the time of executing the program.

The input/output device is an interface that transmits a processing content of the electronic control unit or the sensor to the outside or receives data from the outside according to a predetermined protocol.

The program executed by the arithmetic unit is stored in a non-volatile memory which is a non-temporary storage medium of the electronic control unit or the sensor.

In FIGS. 2 to 4, a host vehicle 800 is traveling in a direction of a host vehicle travel route 710a, and a first sensor detection area 700a of the first vehicle periphery monitoring sensor 10a and a second sensor detection area 700b of the second vehicle periphery monitoring sensor 10b are provided around the host vehicle 800. First to sixth stationary object targets 810a to 810f, non-target stationary object target 820a, and a moving body 830a exist in the periphery of the host vehicle 800. Further, the respective drawings illustrate first and second function fitting results 900a and 900b.

Incidentally, FIGS. 2(A) to 2(D) illustrate a concept of the processing method in a state where the first vehicle periphery monitoring sensor 10a and the second vehicle periphery monitoring sensor 10b are normally attached (without any axis deviation from the horizontal direction to a host vehicle forward direction). On the other hand, FIGS. 3(A) to 3(C) illustrate a concept of the processing method in a state where the second vehicle periphery monitoring sensor 10b is attached to the vehicle such that an attachment angle is axially deviated by an angle θ1 of the horizontal direction with respect to the host vehicle forward direction. Further, FIGS. 4(A) to 4(C) illustrate a concept of the processing method in a state where the first vehicle periphery monitoring sensor 10a is attached with an axis deviation by an angle θ2 from the horizontal direction to the host vehicle forward direction, and the second vehicle periphery monitoring sensor 10b is attached with an axis deviation by an angle θ1 from the horizontal direction to the host vehicle forward direction.

Next, the processing flow of the sensor fusion device 1 having the sensor aiming function of the embodiment of the present invention will be described with reference to FIGS. 1 and 2.

The first vehicle periphery monitoring sensor 10a detects the first to third stationary object targets 810a to 810c, the non-target stationary object target 820a, and the moving body 830a existing in the first sensor detection area 700a, and outputs at least relative coordinates of the first to third stationary object targets 810a to 810c and the non-target stationary object target 820a with respect to the host vehicle, and at least a relative coordinate with respect to the host vehicle and an absolute speed of the moving body 830a. The second vehicle periphery monitoring sensor 10b detects the fourth to sixth stationary object targets 810d to 810f and the non-target stationary object target 820a existing in the second sensor detection area 700b, and outputs at least relative coordinates of the fourth to sixth stationary object targets 810d to 810f and the non-target stationary object target 820a with respect to the host vehicle. The sensor coordinate conversion unit 100a converts the relative coordinates of the first to sixth stationary object targets 810a to 810f, the relative coordinate of the non-target stationary object target 820a, and the relative coordinate of the moving body 830a with respect to the host vehicle, output from the first vehicle periphery monitoring sensor 10a and the second vehicle periphery monitoring sensor 10b with respect to the host vehicle, into unified relative coordinates with respect to the host vehicle and output the converted coordinates to the sensor time synchronization unit 110a. Here, the unified relative coordinates correspond to a coordinate system in which coordinates to which data output by the plurality of vehicle periphery monitoring sensors 10a and 10b conform are collected. For example, as illustrated in FIG. 2(D), the host vehicle forward direction is defined as x, and a host vehicle left direction is defined as y with the center of a front end of the host vehicle as the origin.

Further, detection results of the speed, yaw rate and steering angle of the host vehicle obtained by the host vehicle behavior detection sensor 20a are input to the sensor time synchronization unit 110a. The sensor time synchronization unit 110a corrects the input unified relative coordinates of the first to third stationary object targets 810a to 810c, the non-target stationary object target 820a, and the moving body 830a detected by the first vehicle periphery monitoring sensor 10a and the input unified relative coordinates of the fourth to sixth stationary object targets 810d to 810f and the non-target stationary object target 820a detected by the second vehicle periphery monitoring sensor 10b into the unified relative coordinates at a predetermined timing using the detection results of the speed, yaw rate, and steering angle of the host vehicle detected by the host vehicle behavior detection sensor 20a to synchronize the time of the detection results of the respective sensors, and outputs the time-synchronized unified relative coordinates of the first to sixth targets.

The moving body/stationary object classification unit 120a classifies peripheral objects detected by the first vehicle periphery monitoring sensor 10a and the second vehicle periphery monitoring sensor 10b into the first to sixth stationary objects and the non-target stationary object target 820a, and the moving body 830a, and outputs the unified relative coordinates of the first to sixth stationary object targets 810a to 810f and the non-target stationary object target 820a to the first target selection unit 300a. Furthermore, the moving body/stationary object classification unit 120a outputs the unified relative coordinates of the first to sixth stationary object targets 810a to 810f and the non-target stationary object targets 820a, and the unified relative coordinate and absolute speed of the moving body 830a detected by the first vehicle periphery monitoring sensor 10a and the second vehicle periphery monitoring sensor 10b to the sensor data integration unit 200a.

The sensor data integration unit 200a integrates all pieces of input information input as above and outputs an integration result to a driving control device 2. The driving control device 2 is an automatic driving system (AD-ECU) or a driving assistance system that controls driving of a vehicle using the output from the sensor fusion device 1.

The first target selection unit 300a selects the first to sixth stationary object targets 810a to 810f from among the input first to sixth stationary object targets 810a to 810f and the non-target stationary object target 820a and outputs the unified relative coordinates of the first to sixth stationary object targets 810a to 810f.

The first target detection start determination unit 340a determines that the host vehicle is in a desired traveling state based on information output from the host vehicle behavior detection sensor 20a, the lane marker detection sensor 30a, and the distribution sensing information 40a and outputs a target detection start flag to the first target selection unit 300a.

When the target detection start flag is input, the function fitting unit 310a fits a first function to an array of the first to third stationary object targets 810a to 810c derived from the first vehicle periphery monitoring sensor 10a and outputs the first function fitting result 900a. At the same time, the function fitting unit 310a fits a second function to an array of the fourth to sixth stationary object targets 810d to 810f derived from the second vehicle periphery monitoring sensor 10b and outputs the second function fitting result 900b when the target detection start flag is input.

The first fitting result comparison unit 320a compares the first function fitting result 900a and the second function fitting result 900b, and calculates a function correction value that makes both the results coincide. The coordinate conversion correction value calculation unit 330a calculates a sensor coordinate conversion correction value corresponding to the amount of an attachment axis deviation of the first vehicle periphery monitoring sensor 10a and a sensor coordinate conversion correction value corresponding to the amount of an attachment axis deviation of the second vehicle periphery monitoring sensor 10b based on the function correction value, and outputs the sensor coordinate conversion correction values to the sensor coordinate conversion unit 100a.

Incidentally, differences between the processing flow in the state of FIG. 3 and the processing flow in the state of FIG. 2 are as follows. The second vehicle periphery monitoring sensor 10b detects the third to sixth stationary object targets 810c to 810f and the non-target stationary object target 820a existing in the second sensor detection area 700b, and outputs at least relative coordinates of the third to sixth stationary object targets 810c to 810f and the non-target stationary object target 820a with respect to the host vehicle.

The sensor time synchronization unit 110a corrects the input unified relative coordinates of the first to third stationary object targets 810a to 810c, the non-target stationary object target 820a, and the moving body 830a detected by the first vehicle periphery monitoring sensor 10a and the input unified relative coordinates of the third to sixth stationary object targets 810c to 810f and the non-target stationary object target 820a detected by the second vehicle periphery monitoring sensor 10b into the unified relative coordinates at a predetermined timing using the detection results of the speed, yaw rate, and steering angle of the host vehicle detected by the host vehicle behavior detection sensor 20a to synchronize the time of the detection results of the respective sensors, and outputs the time-synchronized unified relative coordinates of the first to sixth targets.

The function fitting unit 310a fits a third function to an array of the third to sixth stationary object targets 810c to 810f derived from the second vehicle periphery monitoring sensor 10b and outputs a third function fitting result 900c when the target detection start flag is input. The first fitting result comparison unit 320a compares the first function fitting result 900a and the third function fitting result 900c, and calculates a function correction value that makes both the results coincide.

Further, differences between the processing flow in the state of FIG. 4 and the processing flow in the state of FIG. 3 are as follows. The first vehicle periphery monitoring sensor 10a detects the first and second stationary object targets 810a and 810b and the moving body 830a existing in the first sensor detection area 700a, and outputs at least the relative coordinates of the first and second stationary object targets 810a and 810b with respect to the host vehicle, and at least the relative coordinate with respect to the host vehicle and the absolute speed of the moving body 830a.

The sensor time synchronization unit 110a corrects the input unified relative coordinates of the first and second stationary object targets 810a and 810b, the non-target stationary object target 820a, and the moving body 830a detected by the first vehicle periphery monitoring sensor 10a and the input unified relative coordinates of the third to sixth stationary object targets 810c to 810f and the non-target stationary object target 820a detected by the second vehicle periphery monitoring sensor 10b into the unified relative coordinates at a predetermined timing using the detection results of the speed, yaw rate, and steering angle of the host vehicle detected by the host vehicle behavior detection sensor 20a to synchronize the time of the detection results of the respective sensors, and outputs the time-synchronized unified relative coordinates of the first to sixth targets.

When the target detection start flag is input, the function fitting unit 310a fits a fourth function to an array of the first and second stationary object targets 810a and 810b derived from the first vehicle periphery monitoring sensor 10a and outputs a fourth function fitting result 900d. The first fitting result comparison unit 320a compares the fourth function fitting result 900d and the third function fitting result 900c, and calculates a function correction value that makes both the results coincide.

Furthermore, the operation of the sensor fusion device 1 having the sensor aiming function of the embodiment of the present invention will be described with reference to FIGS. 1 to 4. In the embodiment of the present invention, the definition is given as follows for the sake of simplicity. The first to sixth stationary object targets 810a to 810f are objects such as guardrail columns that are periodically arranged at known intervals substantially parallel to a road, and the non-target stationary object target 820a is an utility pole. Further, the environment in which the host vehicle is traveling is a straight road.

The first target selection unit 300a has a function of filtering input unified relative coordinates of stationary objects according to the distance of an array thereof. For example, it is known that an installation interval of guardrail columns is standardized to about 2 to 4 m, and thus, the first to sixth stationary object targets 810a to 810f can be selectively extracted by performing filter processing for matching with the installation interval of the columns at a cycle of 2 to 4 m. That is, the non-target stationary object target 820a existing at a cycle different from that of the first to sixth stationary object targets 810a to 810f can be removed by the filter processing. Specifically, the first target selection unit 300a may hold a plurality of filters in advance and select an appropriate filter based on a filtering result.

The function fitting unit 310a fits an array of the unified relative coordinates of the first to third stationary object targets 810a to 810c derived from the first vehicle periphery monitoring sensor 10a with a linear function, and outputs a first linear function defined in Formula (1) as the first function fitting result 900a.

$$y = a_1 x + b_1 \quad (1)$$

Furthermore, the function fitting unit 310a fits an array of the unified relative coordinates of the fourth to sixth stationary object targets 810d to 810f derived from the second vehicle periphery monitoring sensor 10b with a linear function, and outputs a second linear function defined in Formula (2) as the second function fitting result 900b.

$$y = a_2 x + b_2 \quad (2)$$

Here, axes x and y in Formulas (1) and (2) are set as those illustrated in FIG. 2(D). With the above operation, the function fitting unit 310a causes the first function fitting result 900a to overlap with the array of the unified relative coordinates of the first to third stationary object targets 810a to 810c as illustrated in FIG. 2(B). Similarly, the second function fitting result 900b overlaps with the array of the unified relative coordinates of the fourth to sixth stationary object targets 810d to 810f.

The first fitting result comparison unit 320a compares the input first function fitting result 900a and second function fitting result 900b, and calculates the function correction value that makes the first function fitting result 900a and the second function fitting result 900b coincide. Incidentally, the first and second vehicle periphery monitoring sensors 10a and 10b are normally attached to the host vehicle without any axis deviation in FIG. 2, and thus, the first function fitting result 900a and the second function fitting result 900b are represented by the same function, and extrapolation lines of both the fitting results coincide as illustrated in FIG. 2(C). Therefore, a first function correction value is calculated to be zero.

On the other hand, in FIG. 3, the function fitting unit 310a outputs the first function fitting result 900a and the third function fitting result 900c as illustrated in FIG. 3(C). Here, the third function fitting result 900c is a fitting result of a third linear function defined by Formula (3).

$$y = a_3 x + b_3 \quad (3)$$

In this state, the second vehicle periphery monitoring sensor 10b is attached to the host vehicle with the axis deviation by the angle θ1 from the horizontal direction to the host vehicle forward direction, but the function fitting unit 310a does not have information on the axis deviation. Thus, the third function fitting result 900c is output in the form of being rotated by the angle θ1 from the horizontal direction to a host vehicle rearward direction. Therefore, the first fitting result comparison unit 320a calculates a function correction value that makes the first function fitting result 900a and the third function fitting result 900c coincide. For example, a second function correction value that makes $a_1 = a_3$ is calculated from Formulas (1) and (2) in the state of FIG. 3.

Further, in FIG. 4, the function fitting unit 310a outputs the fourth function fitting result 900d and the third function fitting result 900c as illustrated in FIG. 4(C). Here, the fourth function fitting result 900d is a fitting result of a fourth linear function defined by Formula (4).

$$y = a_4 x + b_4 \quad (4)$$

In this state, the first vehicle periphery monitoring sensor 10a is attached to the host vehicle with the axis deviation by the angle θ2 from the horizontal direction to the host vehicle forward direction, but the function fitting unit 310a does not have information on the axis deviation. Thus, the fourth function fitting result 900d is output in the form of being rotated by the angle θ2 from the horizontal direction to the host vehicle rearward direction. Further, the second vehicle periphery monitoring sensor 10b is attached to the host vehicle with the axis deviation by the angle θ1 from the horizontal direction to the host vehicle forward direction, but the function fitting unit 310a does not have information on the axis deviation. Thus, the third function fitting result 900c is output in the form of being rotated by the angle θ1 from the horizontal direction to the host vehicle rearward direction. Therefore, the first fitting result comparison unit 320a calculates a function correction value that makes the fourth function fitting result 900d and the third function fitting result 900c coincide. For example, a third function correction value that makes a4=a3 and b4=b3 is calculated from Formulas (4) and (3) in the state of FIG. 4.

Therefore, the first fitting result comparison unit 320a operates as described above, and thus, the function correction value has a dimension according to a dimension of the function to be fitted. For example, the function to be fitted is one-dimensional in the present embodiment, and thus, the function correction value is two-dimensional, that is, is formed of two parameters.

The coordinate conversion correction value calculation unit 330a operates as follows. Since the first function correction value output from the first fitting result comparison unit 320a is zero in the state of FIG. 2, a first sensor coordinate conversion correction value output from the coordinate conversion correction value calculation unit 330a is calculated to be zero. On the other hand, a second sensor coordinate conversion correction value for correcting a sensor coordinate conversion value for the second vehicle periphery monitoring sensor 10b is output based on the second function correction value in the state of FIG. 3. Specifically, the second sensor coordinate conversion correction value that rotates the sensor coordinate conversion value by the angle θ1 from the horizontal direction to the host vehicle forward direction is output. Furthermore, a third sensor coordinate conversion correction value that corrects a sensor coordinate conversion value for the first vehicle periphery monitoring sensor 10a is output based on the third function correction value in the state of FIG. 4 in addition to the state of FIG. 3. Specifically, the third sensor coordinate conversion correction value that rotates the sensor coordinate conversion value by the angle θ2 from the horizontal direction to the host vehicle forward direction is output.

Therefore, the sensor coordinate conversion correction value is represented by the function correction value and the function representing the fitting result in the same dimension since the first fitting result comparison unit 320a operates as described above. For example, the sensor coordinate conversion correction value is two-dimensional, that is, is formed of two parameters in the present embodiment. Incidentally, the sensor coordinate conversion correction value may be formed of a 2×2 matrix with a diagonal element being zero.

The sensor coordinate conversion unit 100a operates as follows. When the sensor coordinate conversion correction value is not generated by the coordinate conversion correction value calculation unit 330a, that is, when the target detection start flag is not output from the first target detection start determination unit 340a, the sensor coordinate conversion unit 100a converts the relative coordinates with respect to the host vehicle of the first to sixth stationary object targets 810a to 810f, the non-target stationary object target 820a, and the moving body 830a output from the first and second vehicle periphery monitoring sensors 10a and 10b into the unified relative coordinates with respect to the host vehicle based on an internally held sensor coordinate conversion parameter.

On the other hand, when the sensor coordinate conversion correction value is generated by the coordinate conversion correction value calculation unit 330a, that is, when the target detection start flag is output from the first target detection start determination unit 340a, the sensor coordinate conversion unit 100a changes the internally held sensor coordinate conversion parameter based on the sensor coordinate conversion correction values, and converts the relative coordinates with respect to the host vehicle of the first to sixth stationary object targets 810a to 810f, the non-target stationary object target 820a, and the moving body 830a output from the first and second vehicle periphery monitoring sensors 10a and 10b into the unified relative coordinates with respect the host vehicle.

When the speed, steering angle and yaw rate of the host vehicle output from the host vehicle behavior detection sensor 20a fall within thresholds held in advance, the first target detection start determination unit 340a determines that the host vehicle is traveling straight at a constant speed, and outputs a first target detection start flag. Further, when a curvature of a lane marker output from the lane marker detection sensor 30a and an angle of the host vehicle traveling direction with respect to the lane marker fall within thresholds held in advance, the first target detection start determination unit 340a determines that the host vehicle is traveling straight and outputs a second target detection start flag. Further, when the road curvature of the traveling environment of the host vehicle output from the distribution sensing information 40a falls within a threshold held in advance, the first target detection start determination unit 340a determines that the host vehicle is traveling straight, and outputs a third target detection start flag.

Then, the first target detection start determination unit 340a selects any target detection start flag by arbitration based on determination criteria held in advance among the first to third target detection start flags, and outputs the target detection start flag. Incidentally, it is desirable to adopt a configuration in which all of the host vehicle behavior detection sensor 20a, the lane marker detection sensor 30a, and the distribution sensing information 40a are combined in order to improve the accuracy of the target detection flag, but two or more of these sensors may be combined, or one of them may be used.

With the configurations, processing flow, and operations of the functional blocks described above, the sensor fusion device 1 having the sensor aiming function of the embodiment of the present invention can correct an axis deviation when the axis deviation occurs in the attachment angle of the first vehicle periphery monitoring sensor 10a or the second vehicle periphery monitoring sensor 10b to the host vehicle.

Further, drawing ranges of the first to fourth function fitting results 900a to 900d are within areas of the first and second sensor detection areas 700a and 700b in FIGS. 2 to 4, but may be extrapolated outside the areas of the first and second sensor detection areas 700a and 700b. Even when the first sensor detection area 700a and the second sensor detection area 700b do not have an overlapping area due to this extrapolation outside the areas, the first fitting result comparison unit 320a can compare the first to fourth function fitting results 900a to 900d and calculate the function correction values.

Further, there is an effective that only the first to sixth stationary object targets 810a to 810f required in the above-described processing flow can be selected by implementing the filter processing according to the arrangement of the stationary objects in the first target selection unit 300a.

Further, the environment in which the host vehicle is traveling is assumed as the straight road for the sake of simplicity of description in the embodiment of the present invention, but the same effect can be obtained in any environment in which the behavior of the host vehicle does not change much with time. For example, an environment in which the host vehicle is traveling may be a gently and constantly curved road (for example, a curvature is constant within a sensor detection range).

Further, the first to sixth stationary object targets 810a to 810f may be road distance posts, road guide posts such as roadside reflectors, or road structures such as snow poles as long as being objects that are periodically arranged at predetermined intervals other than the guardrail columns. Further, structures such as railroad crossing barriers and rails existing in a direction intersecting the host vehicle traveling direction may be used. Furthermore, a continuous object that can be detected by both the first and second vehicle periphery monitoring sensors 10a and 10b may be used. Further, a group of a plurality of objects may be used, or a plurality of object groups may be used.

Furthermore, the first target selection unit 300a may select a filter that extracts the array of the fourth to sixth stationary object targets 810d to 810f derived from the second vehicle periphery monitoring sensor 10b from an extraction result of the array of the first to third stationary object targets 810a to 810c derived from the first vehicle periphery monitoring sensor 10a.

Further, in the function fitting unit 310a, the order of the function used for fitting to the array of the fourth to sixth stationary object targets 810d to 810f derived from the second vehicle periphery monitoring sensor 10b may be estimated from the order of the first function fitting result 900a for the array of the first to third stationary object targets 810a to 810c derived from the first vehicle periphery monitoring sensor 10a.

Furthermore, the case where the processing flow of the functional blocks illustrated in FIG. 1 is operated once has been described in the embodiment of the present invention, but the processing flow may be continuously operated a plurality of times. In this case, the detection position accuracy of the first to sixth stationary object targets 810a to 810f is improved. At the same time, the effect of improving the operation accuracy of removing the non-target stationary object target 820a from the first to sixth stationary object targets 810a to 810f can be obtained in the first target selection unit 300a.

Second Embodiment

Figure 5:
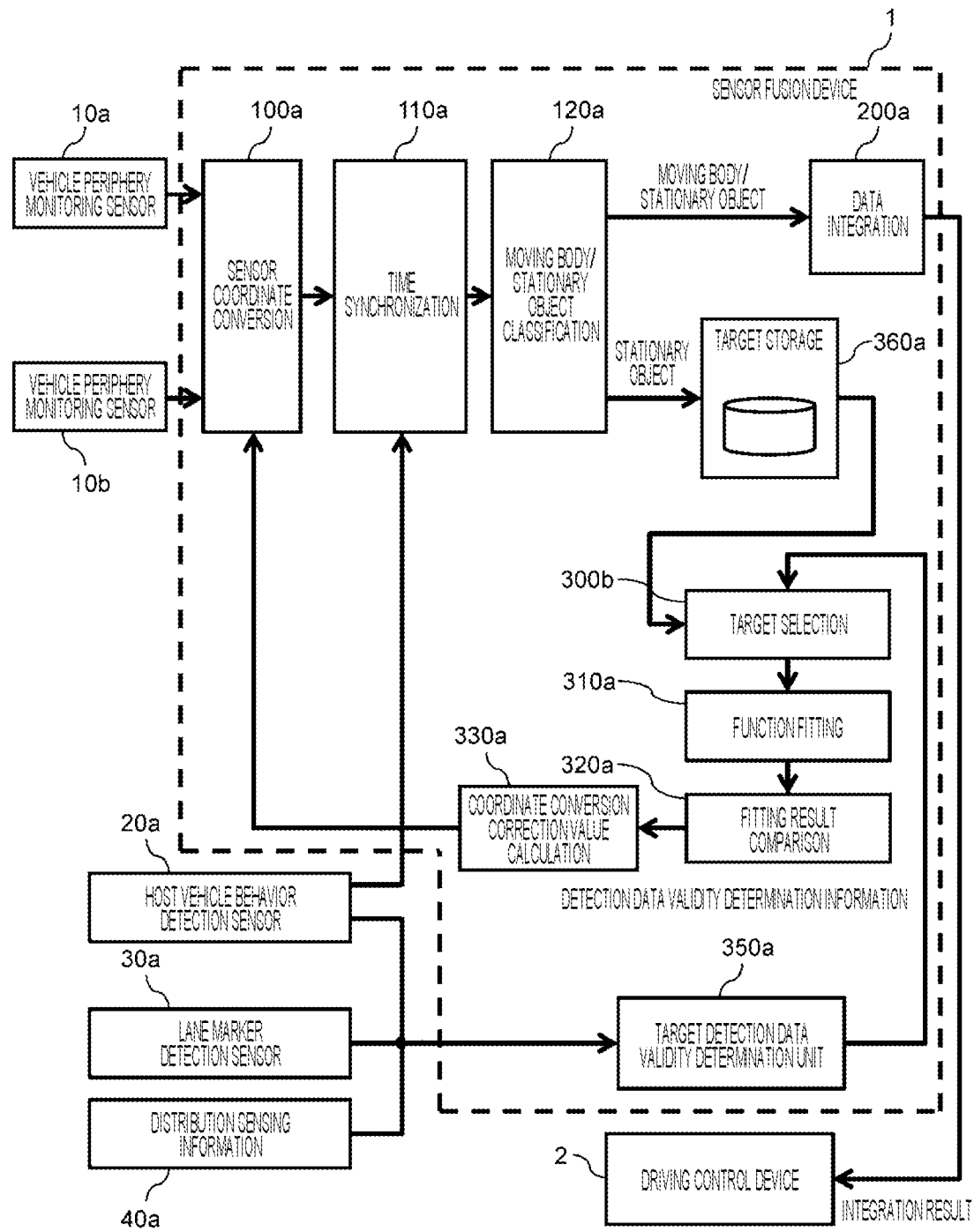
FIG. 5 is a functional block diagram of a sensor fusion device having a sensor aiming function according to a second embodiment.

FIG. 5 is a functional block diagram illustrating an embodiment of the sensor fusion device 1 having a sensor aiming function. A processing flow and an operation of the sensor fusion device 1 having the sensor aiming function, which is a second embodiment of the present invention, will be described with reference to FIG. 5. In the second embodiment, differences from the first embodiment will be mainly described, the same configurations will be denoted by the same reference signs, and the description thereof will be omitted.

As illustrated in FIG. 5, the sensor fusion device 1 of the present embodiment has a target detection data validity determination unit 350a and a target storage unit 360a in addition to the configurations of the first embodiment. Further, a second target selection unit 300b is provided instead of the first target selection unit 300a, and the target detection data validity determination unit 350a is provided instead of the first target detection start determination unit 340a.

When a speed, a steering angle and a yaw rate of a host vehicle output from the host vehicle behavior detection sensor 20a fall within thresholds held in advance, the target detection data validity determination unit 350a determines that the host vehicle is traveling straight at a constant speed, and outputs first target detection data validity determination information. Further, when a curvature of a lane marker output from the lane marker detection sensor 30a and an angle of a host vehicle traveling direction with respect to the lane marker fall within thresholds held in advance, the target detection data validity determination unit 350a determines that the host vehicle is traveling straight at a constant speed and outputs second target detection data validity determination information. Further, when a road curvature of a traveling environment of the host vehicle included in the distribution sensing information 40a is held in advance falls within a threshold held in advance, the target detection data validity determination unit 350a determines that the host vehicle is traveling straight at a constant speed, and outputs third target detection data validity determination information.

Then, the target detection data validity determination unit 350a arbitrates the first to third target detection data validity determination information based on determination criteria held in advance, and then outputs detection data validity determination information. Incidentally, it is desirable to adopt a configuration in which all of the host vehicle behavior detection sensor 20a, the lane marker detection sensor 30a, and the distribution sensing information 40a are combined in order to improve the accuracy of the target detection data validity determination information, but the both or one of the lane marker detection sensor 30a and the distribution sensing information 40a other than the host vehicle behavior detection sensor 20a may be combined. Here, the first to third target detection data validity determination information is time information time-synchronized with an output of the sensor time synchronization unit 110a.

The target storage unit 360a stores unified relative coordinates of stationary object targets and the non-target stationary object target 820a output from the moving body/stationary object classification unit 120a at a desired time held in advance, and information on the time at which the unified relative coordinates of the stationary object targets and the non-target stationary object target 820a have been output from the sensor time synchronization unit 110a.

The second target selection unit 300b selects the unified relative coordinates of the stationary object targets and the non-target stationary object target 820a stored in the target storage unit 360a based on the detection data validity determination information (time information) output from the target detection data validity determination unit 350a. Furthermore, a stationary object target is selected from the stationary object targets and the non-target stationary object target 820a and output. An operation related to the selection of the stationary object target is the same as that in the first embodiment.

With the configurations, processing flow, and operations of the above functional blocks, the sensor fusion device 1 having the sensor aiming function of the present embodiment can implement the operations of the coordinate conversion correction value calculation unit 330a from the second target selection unit 300b at any time, and thus, a correction value can be calculated when a processing load of the entire system is low, and hardware resources such as an arithmetic processing unit of the entire system can be reduced. Further, a series of operations can be executed similarly when the processing load of the entire system is low, and thus, a temperature rise of the entire system can be reduced.

Third Embodiment

Figure 6:
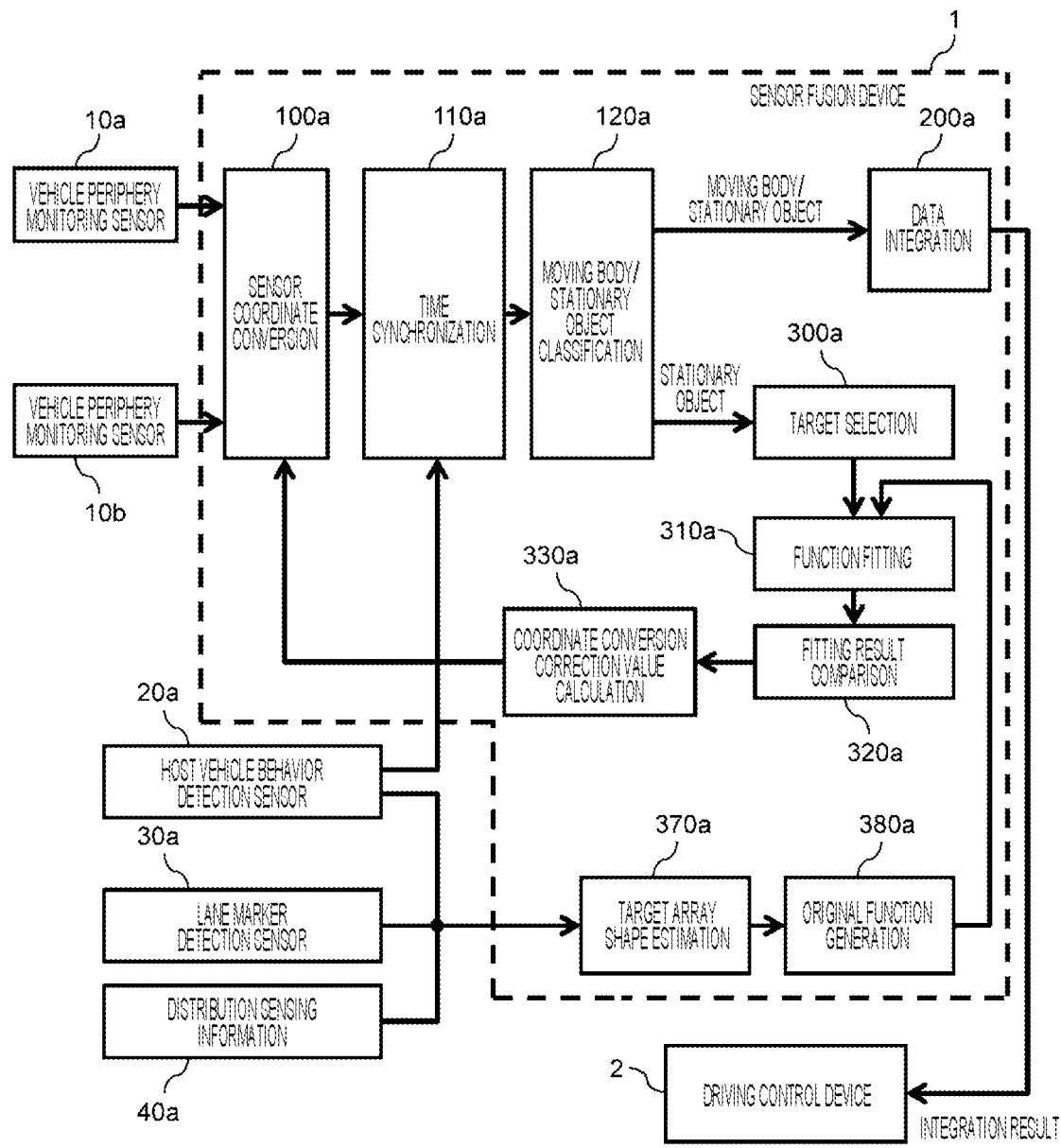
FIG. 6 is a functional block diagram of a sensor fusion device having a sensor aiming function according to a third embodiment.

FIG. 6 is a functional block diagram illustrating an embodiment of the sensor fusion device 1 having a sensor aiming function. A processing flow and an operation of the sensor fusion device 1 having the sensor aiming function, which is a third embodiment of the present invention, will be described with reference to FIG. 6. In the third embodiment, differences from the first embodiment will be mainly described, the same configurations will be denoted by the same reference signs, and the description thereof will be omitted.

As illustrated in FIG. 6, the sensor fusion device 1 of the present embodiment includes a target array shape estimation unit 370a and an original function generation unit 380a, instead of the first target detection start determination unit 340a, in addition to the configurations of the first embodiment.

The target array shape estimation unit 370a estimates a first array shape of stationary object targets with respect to a host vehicle based on a speed, a steering angle, and a yaw rate of the host vehicle output from the host vehicle behavior detection sensor 20a. For example, when the speed, steering angle, and yaw rate of the host vehicle fall within thresholds corresponding to a straight road traveling state held in advance, a straight line is output as the first array shape. Further, the target array shape estimation unit 370a estimates a second array shape of the stationary object targets with respect to the host vehicle based on a curvature of a lane marker output from the lane marker detection sensor 30a. For example, when the curvature of the lane marker falls within a threshold corresponding to the straight road traveling state held in advance, the straight line is output as the second array shape. Further, the target array shape estimation unit 370a estimates a third array shape of stationary object targets with respect to the host vehicle based on a road curvature of a traveling environment of the host vehicle output from the distribution sensing information 40a. For example, when the road curvature falls within a threshold corresponding to the straight road traveling state held in advance, the straight line is output as the third array shape.

Then, the target array shape estimation unit 370a arbitrates the first to third array shapes based on determination criteria held in advance, and then, outputs an array shape. Incidentally, it is desirable to adopt a configuration in which all of the host vehicle behavior detection sensor 20a, the lane marker detection sensor 30a, and the distribution sensing information 40a are combined in order to improve the accuracy of the array shape, but the both or one of the lane marker detection sensor 30a and the distribution sensing information 40a other than the host vehicle behavior detection sensor 20a may be combined.

The original function generation unit 380a generates a function used in fitting by the function fitting unit 310a based on the array shape output from the target array shape estimation unit 370a. For example, when the array shape is straight, a linear function such as Formulas (1) to (4) is generated and output to the function fitting unit 310a. Further, when the array shape is arcuate, a circular function as illustrated in Formula (5) is generated and output to the function fitting unit 310a. In Formula (5), r is a radius of curvature.

$$x^2+y^2=r^2 \qquad (5)$$

With the configurations, processing flow, and operations of the above functional blocks, the sensor fusion device 1 having the sensor aiming function of the present embodiment generates a function used by the function fitting unit 310a based on many information sources, and thus, the probability of using a function with a low degree of coincidence for fitting decreases, and the speed of fitting processing can be improved.

Fourth Embodiment

Figure 7:
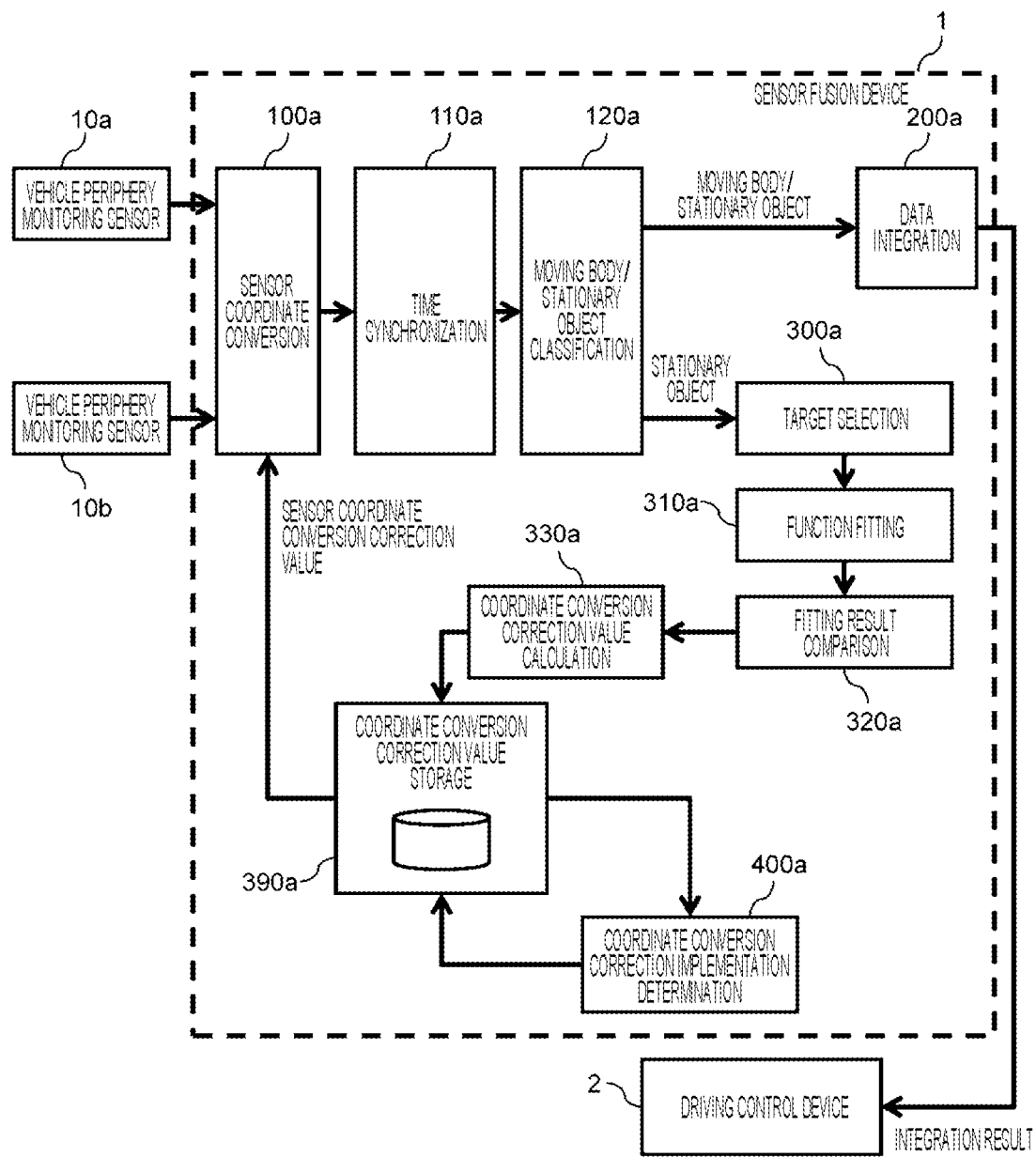
FIG. 7 is a functional block diagram of a sensor fusion device having a sensor aiming function according to a fourth embodiment.

FIG. 7 is a functional block diagram illustrating an embodiment of the sensor fusion device 1 having a sensor aiming function. A processing flow and an operation of the sensor fusion device 1 having the sensor aiming function, which is a fourth embodiment of the present invention, will be described with reference to FIG. 7. In the fourth embodiment, differences from the first embodiment will be mainly described, the same configurations will be denoted by the same reference signs, and the description thereof will be omitted.

As illustrated in FIG. 7, the sensor fusion device 1 of the present embodiment removes the first target detection start determination unit 340a from the configurations of the first embodiment, and is provided with a coordinate conversion correction value storage unit 390a and a first coordinate conversion correction implementation determining unit 400a. Further, output signals of the host vehicle behavior detection sensor 20a and the lane marker detection sensor 30a and the distribution sensing information 40a are not input.

The coordinate conversion correction value storage unit 390a stores a sensor coordinate conversion correction value output from the coordinate conversion correction value calculation unit 330a at a plurality of times.

The first coordinate conversion correction implementation determining unit 400a refers to the coordinate conversion correction value stored in the coordinate conversion correction value storage unit 390a, determines that erroneous detection is not temporary but a sensor itself deviates when the number of times the sensor coordinate conversion correction value is equal to or greater than a threshold held in advance becomes equal to or larger than a predetermined value, and sends a command, to the coordinate conversion correction value storage unit 390a, to output a statistical value (for example, an average value) of the plurality of sensor coordinate conversion correction values to the sensor coordinate conversion unit 100a.

The operation of the sensor coordinate conversion unit 100a is the same as those of the first to third embodiments.

With the configurations, processing flow, and operations of the above functional blocks, the sensor fusion device 1 having the sensor aiming function of the present embodiment calculates sensor coordinate conversion correction values and determines whether to correct sensor values using the sensor coordinate conversion correction values for a plurality of times, so that unnecessary calculation of the sensor coordinate conversion correction value can be reduced, and the accuracy of the sensor coordinate conversion correction value can be improved.

Fifth Embodiment

Figure 8:
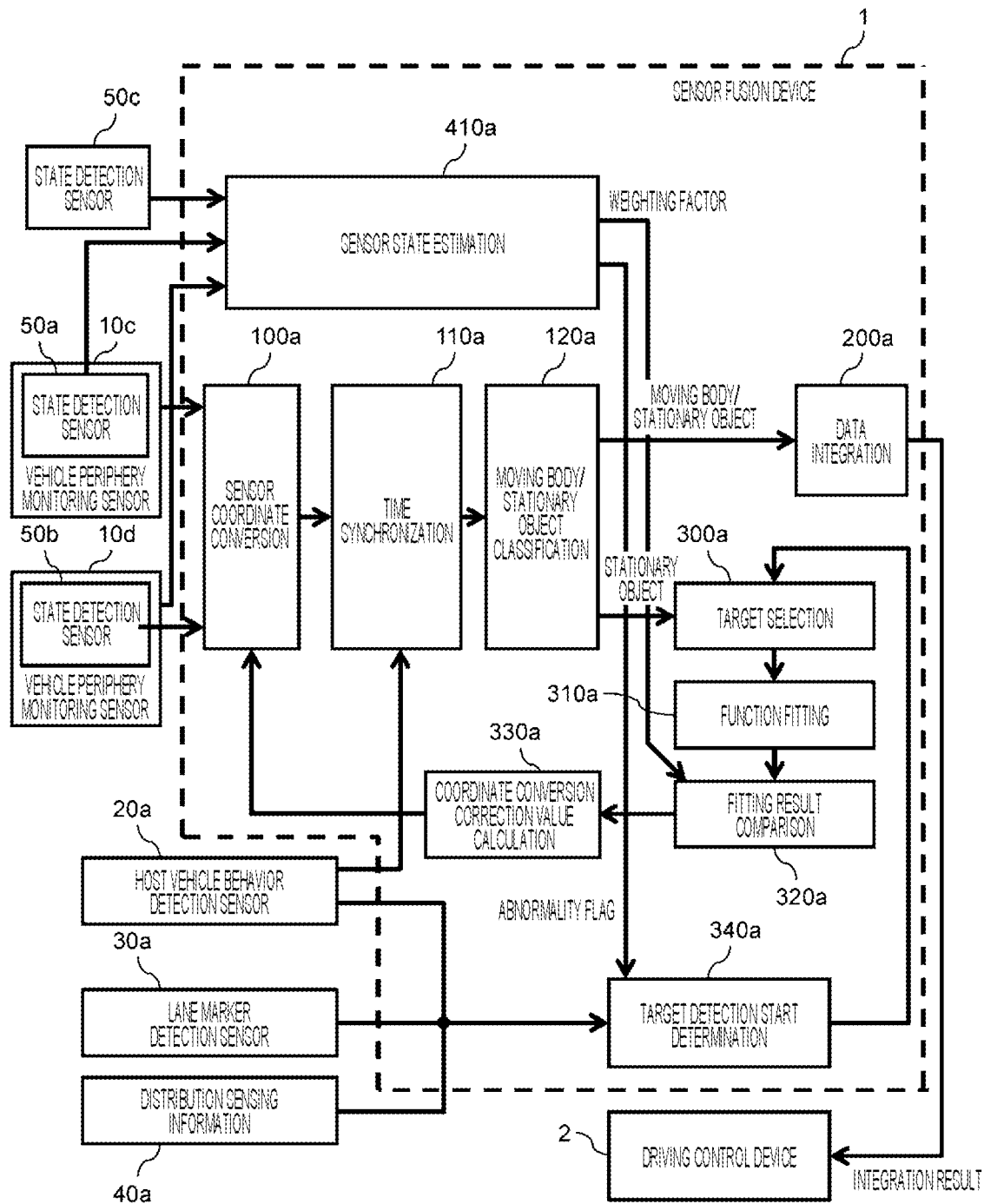
FIG. 8 is a functional block diagram of a sensor fusion device having a sensor aiming function according to a fifth embodiment.

FIG. 8 is a functional block diagram illustrating an embodiment of the sensor fusion device 1 having a sensor aiming function. A processing flow and an operation of the sensor fusion device 1 having the sensor aiming function, which is a fifth embodiment of the present invention, will be described with reference to FIG. 8. In the fifth embodiment, differences from the first embodiment will be mainly described, the same configurations will be denoted by the same reference signs, and the description thereof will be omitted.

As illustrated in FIG. 8, the sensor fusion device 1 of the present embodiment has a sensor state estimation unit 410a in addition to the configurations of the first embodiment. Further, a second fitting result comparison unit 320b is provided instead of the first fitting result comparison unit 320a, and a second target detection start determination unit 340b is provided instead of the first target detection start determination unit 340a. Further, output signals of the first to third state detection sensors 50a to 50c are input to the sensor fusion device 1.

The first to third state detection sensors 50a to 50c are configured using an impact sensor, a temperature sensor, and the like, and detect an impact and a temperature change of a portion to which each of the first to third state detection sensors 50a to 50c is attached. Specifically, the first state detection sensor 50a detects an impact and a temperature change applied to a third vehicle periphery monitoring sensor 10c. Further, the second state detection sensor 50b detects an impact and a temperature change applied to a fourth vehicle periphery monitoring sensor 10d. The third state detection sensor 50c is attached to a place where it is easy to detect an impact applied to the entire vehicle, such as a chassis of a host vehicle, and detects an impact applied to any place and a temperature change.

The sensor state estimation unit 410a estimates attachment states of the third and fourth vehicle periphery monitoring sensors 10c and 10d with respect to the host vehicle based on data related to the impacts and the temperature changes output from the first to third state detection sensors 50a to 50c. For example, when the data on the impact output from the first state detection sensor 50a is equal to or greater than a threshold held in advance, a first abnormality flag indicating that an abnormality has occurred in the attachment state of the third vehicle periphery monitoring sensor 10c is output to the second target detection start determination unit 340b. For example, when the data on the impact output from the second state detection sensor 50b is equal to or greater than a threshold held in advance, the sensor state estimation unit 410a outputs a second abnormality flag indicating that an abnormality has occurred in the attachment state of the fourth vehicle periphery monitoring sensor 10d to the second target detection start determination unit 340b. Furthermore, when the data on the impact output from the third state detection sensor 50c is equal to or greater than a threshold held in advance, the sensor state estimation unit 410a outputs a third abnormality flag indicating that abnormalities have occurred in the attachment states of the third and fourth vehicle periphery monitoring sensors 10c and 10d to the second target detection start determination unit 340b.

Similarly, when data on a temperature output from the first state detection sensor 50a exceeds an operating range held in advance, it is determined that the third vehicle periphery monitoring sensor 10c is at a high temperature or a low temperature, and the first abnormality flag indicating that an abnormality has occurred in the sensor is output to the second target detection start determination unit 340b. Similarly, when data on a temperature output from the second state detection sensor 50b exceeds an operating range held in advance, the sensor state estimation unit 410a determines that the fourth vehicle periphery monitoring sensor 10d is at a high temperature or a low temperature, and outputs the second abnormality flag indicating that an abnormality has occurred in the sensor to the second target detection start determination unit 340b. Furthermore, when data on a temperature output from the third state detection sensor 50c exceeds an operating range held in advance, the sensor state estimation unit 410a determines that the third and fourth vehicle periphery monitoring sensors 10c and 10d are at a high temperature or a low temperature, and outputs the third abnormality flag indicating that abnormalities have occurred in the sensor to the second target detection start determination unit 340b.

Then, the sensor state estimation unit 410a outputs weighting factors for the third and fourth vehicle periphery monitoring sensors 10c and 10d to the second fitting result comparison unit 320b based on the data on the impacts and the temperature changes output from the first to third state detection sensors 50a to 50c.

After receiving the first to third abnormality flags, the second target detection start determination unit 340b executes the same operation as that of the first target detection start determination unit 340a of the first embodiment. Therefore, a sensor coordinate conversion correction value is not calculated when no abnormality has occurred.

The second fitting result comparison unit 320b outputs a function correction value that makes fifth and sixth function fitting results coincide using the weighting factors in comparison of the fifth function fitting result derived from the third vehicle periphery monitoring sensor 10c and the sixth function fitting result derived from the fourth vehicle periphery monitoring sensor 10d which have been output from the function fitting unit 310a.

With the configurations, processing flow, and operations of the above functional blocks, the sensor fusion device 1 having the sensor aiming function of the present embodiment causes the second target selection unit 300b to the coordinate conversion correction value calculation unit 330a to operate to calculate the sensor coordinate conversion correction value when it is determined that the abnormality has occurred due to the impact or the temperature. Thus, the number of unnecessary operations in which the sensor coordinate conversion correction value becomes zero can be reduced as compared with the first embodiment so that the power consumption of the entire system can be reduced. Further, when the second fitting result comparison unit 320b calculates the function correction value that makes the fifth and sixth function fitting results coincide, each of the function fitting results can be weighted, and thus, the accuracy of the function correction value can be improved.

Incidentally, the first to third state detection sensors 50a to 50c are configured using the impact sensor and the temperature sensor in the present embodiment, but are not necessarily configured using only the impact sensor or the temperature sensor. Further, another sensor (for example, a humidity sensor) may be used. Furthermore, any combination of these sensors may be used.

Sixth Embodiment

Figure 9:
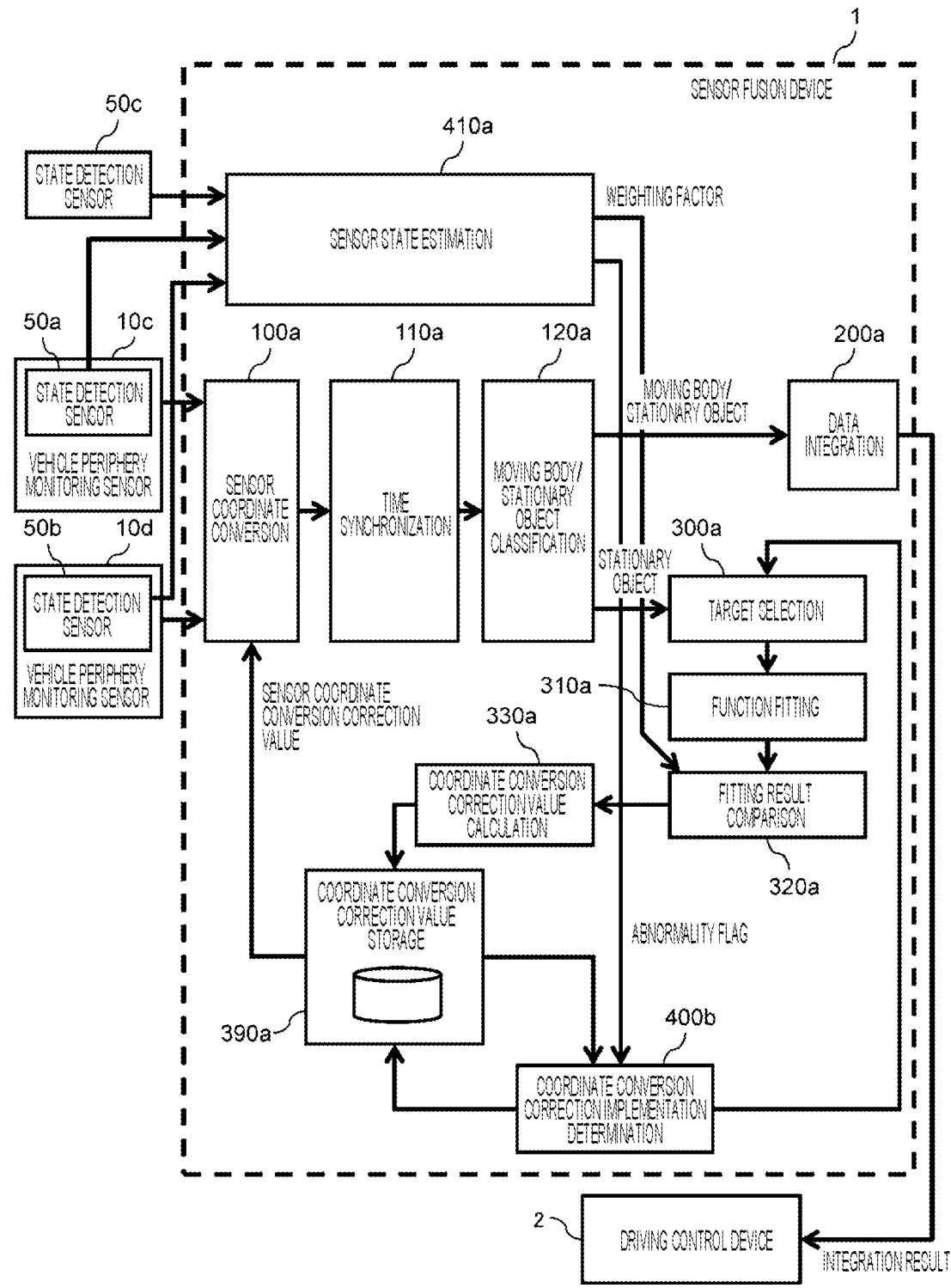
FIG. 9 is a functional block diagram of a sensor fusion device having a sensor aiming function according to a sixth embodiment.

FIG. 9 is a functional block diagram illustrating an embodiment of the sensor fusion device 1 having a sensor aiming function. A processing flow and an operation of the sensor fusion device 1 having the sensor aiming function, which is a sixth embodiment of the present invention, will be described with reference to FIG. 9. In the sixth embodiment, differences from the first, fourth, and fifth embodiments will be mainly described, the same configurations will be denoted by the same reference signs, and the description thereof will be omitted.

As illustrated in FIG. 9, the sensor fusion device 1 of the present embodiment removes the first target detection start determination unit 340a from the configurations of the first embodiment, and is provided with the coordinate conversion correction value storage unit 390a and a second coordinate conversion correction implementation determining unit 400b. Further, output signals of the host vehicle behavior detection sensor 20a and the lane marker detection sensor 30a and the distribution sensing information 40a are not input.

The coordinate conversion correction value storage unit 390a stores a sensor coordinate conversion correction value output from the coordinate conversion correction value calculation unit 330a at a plurality of times, which is similar to the fourth embodiment.

The second coordinate conversion correction implementation determining unit 400b receives first to third abnormality flags output from the sensor state estimation unit 410a, and sends a command, to the coordinate conversion correction value storage unit 390a, to output a sensor coordinate conversion correction value to the sensor coordinate conversion unit 100a when the latest sensor coordinate stored in the coordinate conversion correction value storage unit 390a is equal to or greater than a threshold held in advance.

With the configurations, processing flow, and operations of the above functional blocks, the sensor fusion device 1 having the sensor aiming function of the present embodiment can quickly adjust a sensor coordinate conversion parameter of the sensor coordinate conversion unit 100a when there is a possibility that an abnormality has occurred in the third and fourth vehicle periphery monitoring sensors 10c and 10d.

Seventh Embodiment

Figure 10:
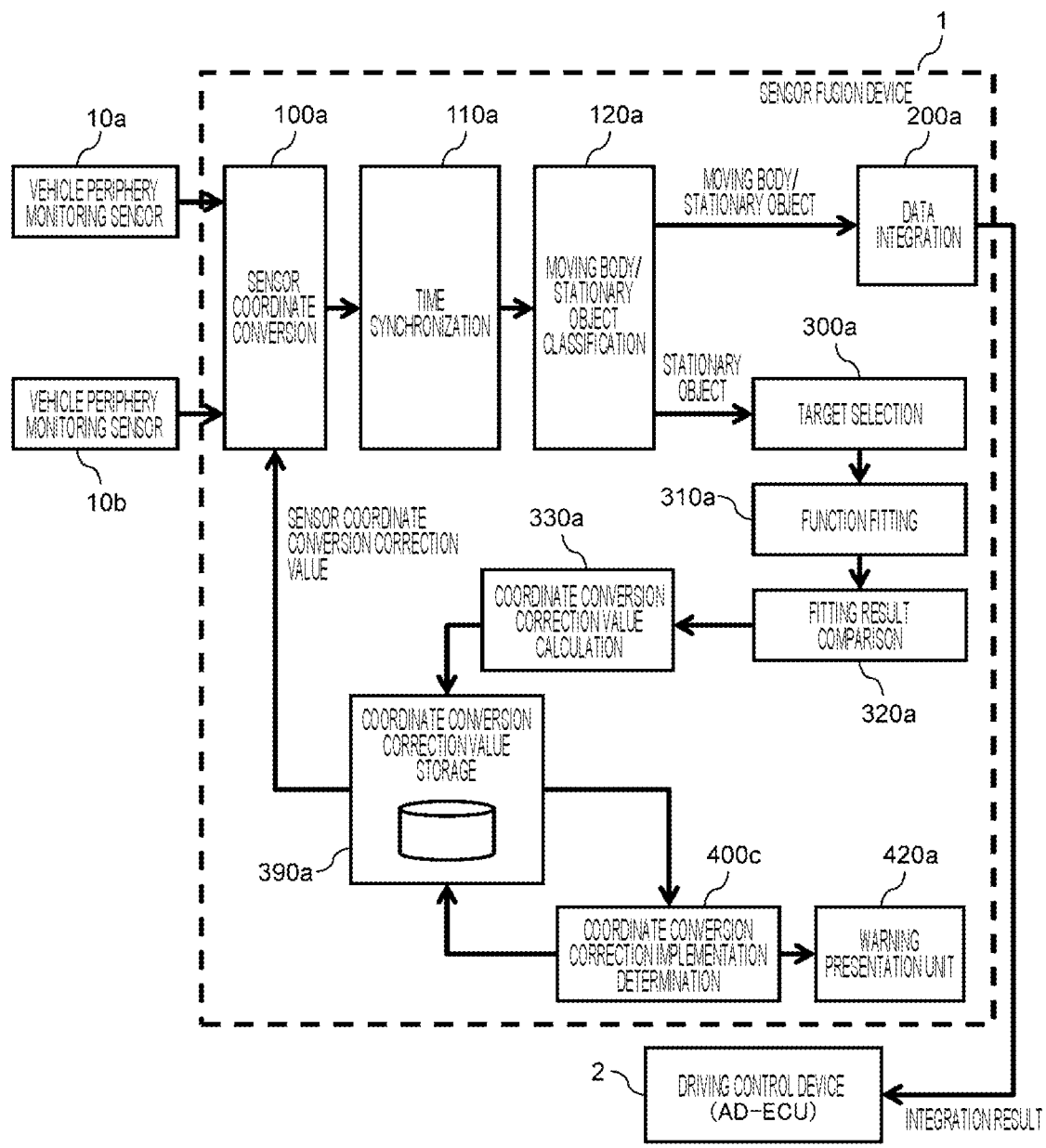
FIG. 10 is a functional block diagram illustrating an embodiment of a sensor fusion device having a sensor aiming function of a seventh embodiment.

FIG. 10 is a functional block diagram illustrating an embodiment of the sensor fusion device 1 having a sensor aiming function. A processing flow and an operation of the sensor fusion device 1 having the sensor aiming function, which is a seventh embodiment of the present invention, will be described with reference to FIG. 10. In the seventh embodiment, differences from the first and fourth embodiments will be mainly described, the same configurations will be denoted by the same reference signs, and the description thereof will be omitted.

As illustrated in FIG. 10, the sensor fusion device 1 of the present embodiment has a third coordinate conversion correction implementation determining unit 400c instead of the first coordinate conversion correction implementation determining unit 400a, and is provided with a warning display unit 420a in addition to the configurations of the fourth embodiment.

The third coordinate conversion correction implementation determining unit 400c refers to a sensor coordinate conversion correction value stored in the coordinate conversion correction value storage unit 390a and outputs a warning display flag to the warning display unit 420a when the number of times the sensor coordinate conversion correction value is equal to or greater than a threshold held in advance becomes equal to or larger than a predetermined threshold, in addition to the operation of the first coordinate conversion correction implementation determining unit 400a of the fourth embodiment.

When receiving the warning display flag, the warning presentation unit 420a displays a warning on a warning device of a host vehicle or an external system of the host vehicle (a cloud server or the like). The warning has at least one or more levels, for example, Level 1: Inspection recommended, Level 2: Inspection required, Level 3: System stop, and the like. A driver or an occupant sees a warning display and takes a necessary measure (automatic driving, stop of driving assistance, vehicle repair, and the like). The warning presentation unit 420a may present a warning by sound or vibration instead of or in addition to the warning display.

With the configurations, processing flow, and operations of the above functional blocks, the sensor fusion device 1 having the sensor aiming function of the present embodiment can send the warning regarding a state of an axis deviation of a sensor to the driver or the occupant or the external system of the host vehicle, and thus, the necessity of the inspection of the host vehicle can be quickly determined, and the safety of the system can be improved.

Eighth Embodiment

Figure 11:
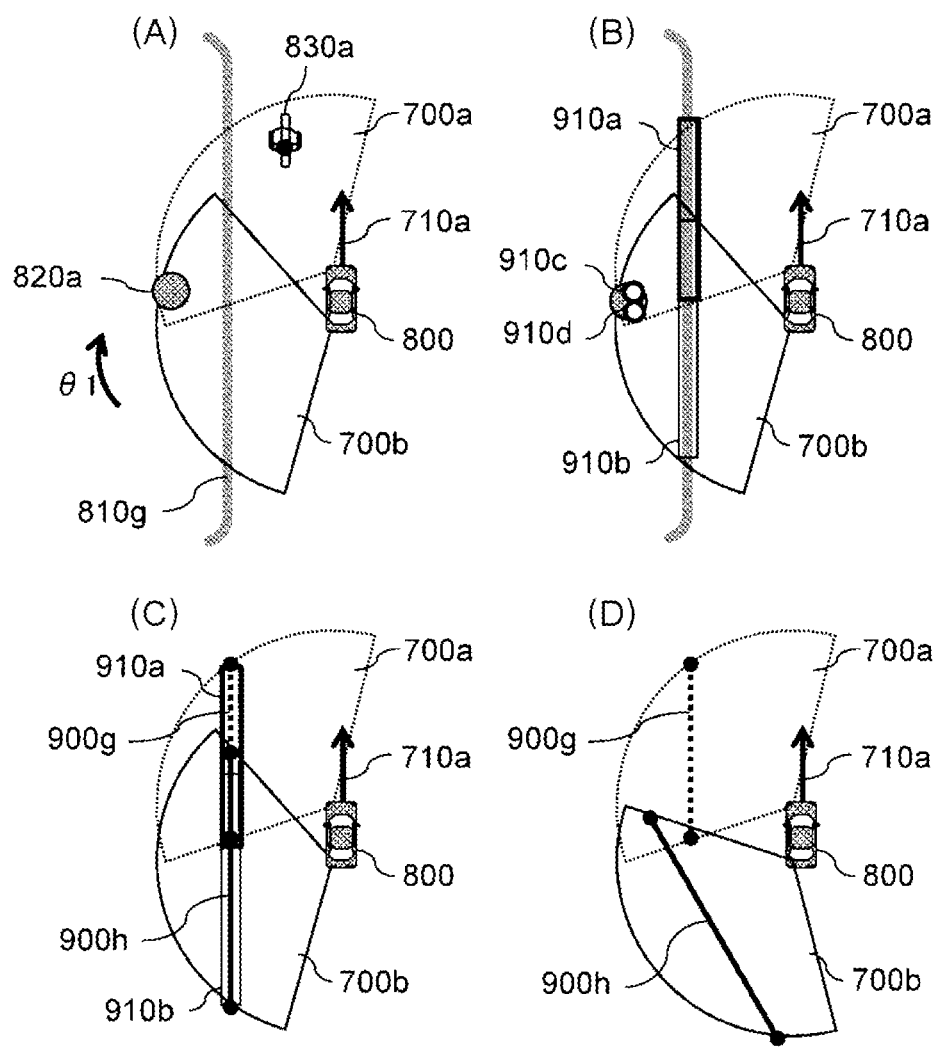
FIG. 11 is a conceptual view illustrating a processing method of a sensor fusion device having a sensor aiming function of an eighth embodiment.

FIG. 11 is a conceptual view illustrating a processing method of the sensor fusion device 1 having a sensor aiming function. An operation of the sensor fusion device 1 having the sensor aiming function, which is an eighth embodiment of the present invention, will be described with reference to FIGS. 1 and 11. In the eighth embodiment, differences from the first embodiment will be mainly described, the same configurations will be denoted by the same reference signs, and the description thereof will be omitted.

In the eighth embodiment, a seventh stationary object target 810g, the non-target stationary object target 820a, and the moving body 830a exist in the periphery of the host vehicle 800 as illustrated in FIG. 11. Further, the drawing illustrates first to fourth sensor observation results 910a to 910d and seventh and eighth function fitting results 900g and 900h.

The first and second vehicle periphery monitoring sensors 10a and 10b detect the seventh stationary object target 810g and output the first and second sensor observation results 910a and 910b, respectively. The first and second sensor observation results 910a and 910b are represented by line segments, plane polygons, or three-dimensional polygons. Meanwhile, the first and second vehicle periphery monitoring sensors 10a and 10b detect the first non-target stationary object target 820a and output the third and fourth sensor observation results 910c and 910d, respectively. The third and fourth sensor observation results 910c and 910d have information on points.

The first target selection unit 300a selects the first and second sensor observation results 910a and 910b from among the first to fourth sensor observation results 910a to 910d using a filter held in advance. Here, the filter has the same form as the form (line segment, plane polygon, or three-dimensional polygon) of the first to fourth sensor observation results 910a to 910d.

The function fitting unit 310a fits the first sensor observation result 910a derived from the first vehicle periphery monitoring sensor 10a with a function, and outputs the seventh function fitting result 900e. Further, the function fitting unit 310a fits the first sensor observation result 910a derived from the second vehicle periphery monitoring sensor 10a with a function, and outputs the eighth function fitting result 900f.

The first fitting result comparison unit 320*a* compares the seventh and eighth function fitting results 900*e* and 900*f*, and calculates a function correction value that makes the seventh function fitting result 900*e* and the eighth function fitting result 900*f* coincide.

With the configurations, processing flow, and operations of the above functional blocks, the sensor fusion device 1 having the sensor aiming function of the present embodiment has the above effect even when a stationary object target has a plane structure.

Incidentally, the seventh stationary object target 810*g* may be any road structure having a plane structure, such as a guardrail, a noise barrier, a curb, and a median strip, in the present embodiment.

Further, each of the first and second vehicle periphery monitoring sensors 10*a* and 10*b* outputs one sensor observation result in the present embodiment, but each of the sensors may output a plurality of observation results.

In the above-described embodiments, the first to fourth vehicle periphery monitoring sensors 10*a* to 10*d* may be the same type of sensor or different types of sensors. Further, the first to fourth vehicle periphery monitoring sensors 10*a* to 10*d* may be any sensor such as a millimeter wave radar, cameras (visible light, near-infrared, mid-infrared, far-infrared cameras), light detection and ranging (LiDAR), sonar, a time of flight (TOF) sensor, and a sensor combining them.

Further, the configurations, processing flow, and operations of the functional blocks described in each of the embodiments may be arbitrarily combined.

Furthermore, the in-vehicle device (ECU) calculates the sensor coordinate conversion correction value in the above description, but a computer connected to be capable of communicating with a vehicle may calculate the sensor coordinate conversion correction value.

As described above, the sensor fusion device 1 of the embodiment of the present invention includes: the sensor coordinate conversion unit 100*a* that converts each piece of the sensor data detected by the vehicle periphery monitoring sensors 10*a* to 10*d* from the coordinate system unique to each of the vehicle periphery monitoring sensors 10*a* to 10*d* into a predetermined unified coordinate system (unified relative coordinates); the target selection unit 300*a* or 300*b* that selects predetermined features (the stationary object target 810*a* to 810*f*) from each piece of the sensors data of the vehicle periphery monitoring sensors 10*a* to 10*d*; the function fitting unit 310*a* that defines functions each approximating an array state of the selected features for the respective vehicle periphery monitoring sensors 10*a* to 10*d*; the fitting result comparison unit 320*a* or 320*b* that compares the functions each approximating the array state of the features detected by each of the vehicle periphery monitoring sensors 10*a* to 10*d*; and the coordinate conversion correction value calculation unit 330*a* that calculates a correction amount for converting coordinates of the features detected by the vehicle periphery monitoring sensors 10*a* to 10*d* from a result of the comparison of the functions. The sensor coordinate conversion unit 100*a* converts the vehicle periphery monitoring sensors 10*a* to 10*d* into the unified relative coordinates using the calculated correction amount. Thus, it is possible to correct the axis deviation of the attachment angle with respect to the host vehicle that occurs in the vehicle periphery monitoring sensors 10*a* and 10*b*.

Further, the vehicle periphery monitoring sensors 10*a* to 10*d* may be millimeter wave radars. Further, the vehicle periphery monitoring sensors 10*a* to 10*d* may include at least one millimeter wave radar and at least one camera. In this manner, the sensor fusion device 1 of the present embodiment can calculate the correction amounts of various types of the vehicle periphery monitoring sensors 10*a* to 10*d*.

Further, the target selection units 300*a* and 300*b* use structures arranged substantially parallel to the road at known intervals, the correction amounts of the vehicle periphery monitoring sensors 10*a* to 10*d* can be accurately calculated.

Further, the target selection units 300*a* and 300*b* select a predetermined feature using a filter corresponding to a known array state related to the feature, the stationary object targets 810*a* to 810*f* used for calculating the correction amount can be easily detected.

Further, the fitting result comparison units 320*a* and 320*b* extrapolate lines represented by the defined functions outside the detection areas of the vehicle periphery monitoring sensors 10*a* to 10*d*, and compare the extrapolated lines with each other. Thus, even when the detection areas (the sensor detection areas 700*a* and 700*b*) of the vehicle periphery monitoring sensors 10*a* and 10*b* do not overlap, the function fitting results 900*a* and 900*b* can be compared, and the correction amount can be calculated.

Further, the warning presentation unit 420*a* that outputs a warning when the calculated correction amount is equal to or larger than a predetermined threshold is provided, and thus, the occupant or a maintenance staff can take a necessary measure.

Further, when at least one of the impact and the temperature applied to the host vehicle detected by the state detection sensors 50*a* to 50*c* satisfies a predetermined condition, the sensor coordinate conversion correction value is output. Thus, the sensor coordinate conversion correction value is not calculated when no abnormality has occurred, and the processing load can be reduced.

Incidentally, the present invention is not limited to the above-described embodiments, and may include various modifications and equivalent configurations that fall within the scope of the appended claims. For example, the above-described embodiments have been described in detail in order to describe the present invention in an easily understandable manner, and the present invention is not necessarily limited to one including the entire configuration that has been described above. Further, a part of the configuration of a certain embodiment may be replaced with the configuration of another embodiment. Further, the configuration of a certain embodiment may be added with the configuration of another embodiment. Further, addition, deletion or substitution of other configurations may be made with respect to some configurations of each embodiment.

Further, each configuration, function, processing unit, processing means, and the like described above may be, partially or fully, implemented by hardware, for example, by designing it using an integrated circuit and the like, or implemented by software by causing the processor to interpret and execute a program that implements each function.

Information such as programs, tables, and files that realize the respective functions can be stored in a storage device such as a memory, a hard disk, and a solid state drive (SSD), or a recording medium such as an IC card, an SD card, a DVD, and BD.

Further, only a control line and an information line considered to be necessary for the description are illustrated, and all the control lines and information lines required for implementation are not necessarily illustrated. In practice, it can be considered that almost all components are interconnected.

REFERENCE SIGNS LIST 10a to 10d vehicle periphery monitoring sensor
20a host vehicle behavior detection sensor
30a lane marker detection sensor
40a distribution sensing information
50a to 50c state detection sensor
100a sensor coordinate conversion unit
110a sensor time synchronization unit
120a moving body/stationary object classification unit
200a sensor data integration unit
300a, 300b target selection unit
310a function fitting unit
320a, 320b fitting result comparison unit
330a coordinate conversion correction value calculation unit
340a, 340b target detection start determination unit
350a target detection data validity determination unit
360a target storage unit
370a array shape estimation unit
380a original function generation unit
390a coordinate conversion correction value storage unit
400a to 400c coordinate conversion correction implementation determining unit
410a sensor state estimation unit
420a warning presentation unit
700a, 700b sensor detection area
710a host vehicle travel route
800 host vehicle
810a to 810g stationary object target
820a non-target stationary object target
830a moving body
900a to 900g function fitting result
910a to 910d sensor observation result

The invention claimed is:

1. A driving control system, which controls driving of a vehicle, comprising:
a sensor fusion device that integrates and outputs detection results of two or more sensors; and
a driving control device that controls the driving of the vehicle using an output from the sensor fusion device,
wherein the sensor fusion device comprises at least one computer configured to:
convert sensor data detected by the two or more sensors from a coordinate system unique to the two or more sensors into a unified coordinate system;
select features from the sensor data detected by each of the two or more sensors;
define functions each approximating an array state of the features for the respective two or more sensors;
compare the functions each approximating the array state of the features detected by each of the two or more sensors and extrapolates lines represented respectively by the defined functions outside detection areas of the two or more sensors, and compares the extrapolated lines with each other;
calculate a correction amount for converting coordinates of the features detected by the two or more sensors from a result of the comparison of the functions; and
integrate the sensor data and outputs an integration result, and
convert the sensor data into the unified coordinate system using the calculated correction amount.

2. The driving control system according to claim 1, wherein
at least one of the two or more sensors is a millimeter wave radar.

3. The driving control system according to claim 1, wherein
the two or more sensors includes at least one millimeter wave radar and at least one camera.

4. The driving control system according to claim 1, wherein
the features are structures arranged substantially parallel to a road at a known interval.

5. The driving control system according to claim 4, wherein the sensor fusion device further comprises
a filter corresponding to a known array state related to the selected feature.

6. The driving control system according to claim 1, wherein the computer is further configured to
output a warning when the calculated correction amount is equal to or larger than a predetermined threshold.

7. The driving control system according to claim 1, wherein
at least one of an impact and a temperature applied to a vehicle detected by a state detection sensor is input, and
the correction amount is output when at least one of the impact and the temperature satisfies a predetermined condition.

* * * * *